H. A. HAMMERS.
EQUALIZER SHOCK ABSORBER FOR GANG AND SULKY PLOWS.
APPLICATION FILED APR. 19, 1918.

1,294,655. Patented Feb. 18, 1919.

Witnesses
Philip A. H. Terrell
Francis J. Boswell

Inventor
H. A. Hammers,
By D. Swift & Co.
Attorneys

UNITED STATES PATENT OFFICE.

HENRY A. HAMMERS, OF ARLINGTON, MINNESOTA.

EQUALIZER SHOCK-ABSORBER FOR GANG AND SULKY PLOWS.

1,294,655.  Specification of Letters Patent.  Patented Feb. 18, 1919.

Application filed April 19, 1918. Serial No. 229,566.

*To all whom it may concern:*

Be it known that I, HENRY A. HAMMERS, a citizen of the United States, residing at Arlington, in the county of Sibley, State of Minnesota, have invented a new and useful Equalizer Shock-Absorber for Gang and Sulky Plows; and I do hereby declare the following to be a full, clear, and exact description of the invention, such as will enable others skilled in the art to which it appertains to make and use the same.

This invention relates to an improved equalizing shock absorber for gang and sulky plows and the like.

Very often in working gang and sulky plows, the plows come in contact with obstructions, and the plow is brought to a sudden stop, in which case strains or jars are exerted upon the shoulders of the draft animal. Furthermore at such times, some part of the machine or of the harness will give away or break.

Therefore an object of the present invention is to provide a strain or shock equalizing device connected between the double-tree or swingle tree and a portion of the plow frame, for overcoming these disadvantages, by permitting a yielding action. In using this strain equalizing device, the plow when brought to a standstill, the spring means of the device is allowed to yield and the draft animals brought to a gradual stop, thereby relieving the shock, strains or jerking motions on the shoulders of the animals.

A further object of the invention is the provision of means for permitting of play between the spring tensioned parts of the equalizer whereby said parts may tilt slightly relative to each other, thereby prevent any strain on the parts of the equalizer.

In practical fields the details of construction may necessitate alterations falling within the scope of what is claimed.

The invention comprises further features and combination of parts as hereinafter set forth shown in the drawings and claimed.

In the drawings:—

Figure 1:
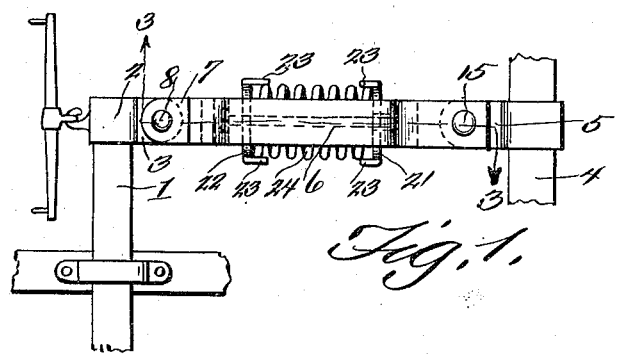
Figure 1 is a plan view showing the application of the improved strain or shock equalizing device.
Figure 2:
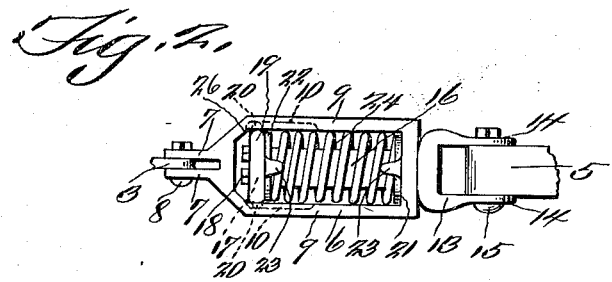
Fig. 2 is a view in side elevation of the same.
Figure 3:
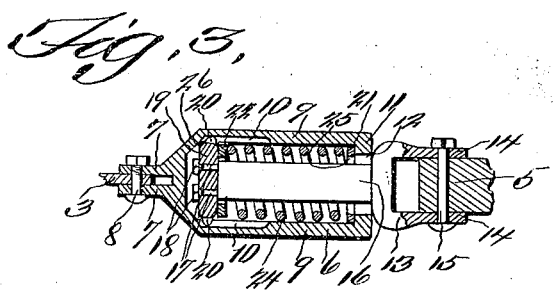
Fig. 3 is a sectional view on line 3—3 of Fig. 1.

Referring more especially to the drawings, 1 designates a conventional form of double tree, which may be mounted in any suitable manner, convenient enough to comply with the application of the strain or shock equalizer. This double-tree has a strap 2 on its end provided with a lug 3, and 4 denotes any suitable or convenient part of a gang or sulky plow provided with a lug or ear 5. The strain equalizing device comprises a frame 6, which may be any suitable shape preferably rectangular having its forward end tapered as shown and terminating in forks 7, between which the lug 3 is pivoted on the bolt 8. The longitudinal side walls 9 of the frame 6 have elongated grooves 10 on their inner opposing faces. The end 11 of the frame 6 has an elongated opening or slot 12 and 13 denotes a suitable U shaped clevis, between the arms 14 of which the lug or ear 5 is arranged. The bolt 15 passes through the arms or forks 14 of the clevis and through the lug or ear 5, so as to pivotally unite the clevis to the plow structure. The clevis 13 has a forwardly extending flattened shank 16 extending through the elongated opening or slot 12. The forward end of the flattened shank 16 is provided with integral reduced threaded extensions 17 having nuts 18 threaded thereon. A head member 19 is secured to the forward end of the flattened shank 16 by means of the threaded extensions 17 and nuts 18. This head member on its opposite ends has lugs 20 engaging and guiding in the grooves 10 of the upper and lower wall 9 of the frame 6, so as to guide the head in its rearward movement. It is to be noted that the ends of the head member are rounded and the slot 12 is elongated enough, so as to permit the flattened shank 16 to angle in the frame 6, incident to an upward tilting action of the frame, at the time the frame yields forwardly. Mounted upon the flattened shank and in the frame 6, one adjacent the end 11 of the frame, and in the other adjacent the head member 19, are disks 21 and 22. The disk 21 has an elongated slot or opening 25 similar to the opening or slot 12, to allow the flattened shank to angle in the frame. Interposed between the metal disks 21 and 22 and surrounding the flattened shank 16 is a coil spring 24, the action of which holds the end 11 of the frame 6 in contact with the clevis 13, and the head member in contact with the other end of the frame, under normal conditions. However, as a draft animal exerts pulling actions on the double-tree, the spring 24 is compressed, thereby allowing the clevis and the frame 6 to yield or move relative to each other. When the plow comes in contact with an obstruction, the plow is brought to a certain standstill, while owing to the yielding compressing action of the spring, the frame is allowed to move forwardly, thereby bringing the draft animals to gradual stopping, relieving the strains or jars on the shoulders of the animals. The disks 21 and 22 at diametrically opposite points are provided with lugs 23, overlying opposite ends of the springs, holding the springs concentrically in the frame and with the shank 16. The forward end of the rectangular opening of the frame 6 is slightly tapered, and the inclined walls 26 act as abutments to limit the rearward movement of the frame as its end 11 contacts with the clevis. It is to be noted that by tapering the end of the opening in the frame as shown at 26 sufficient space is allowed to prevent the nuts 18 from contacting with the end of the frame.

The invention having been set forth what is claimed as new and useful is:—

1. In a shock or strain relieving device, a frame having one end pivoted to a double-tree, a clevis pivoted to a plow frame and provided with an extension loosely fitting into the frame, said extension having a head connected thereto, disks on said extensions one adjacent one end of said first frame and the other adjacent the head, yieldable means between the disks and surrounding the extension, diametrically opposite lugs carried by the disks overlying the yieldable means to hold the same concentric with the extension and concentrically with the frame, and means formed in one end of the frame to receive the extension whereby the extension may angle in the frame.

2. In a shock or strain relieving device, a frame having one end pivoted to a double-tree, a clevis pivoted to a plow frame, one end of the first frame having an elongated rectangular opening, said clevis having a flat extension loosely engaging said rectangular opening and extending into the first frame, a head on the end of the extension, guiding means for the head, a pair of opposing concentric disks of diameters substantially equal to the opening in the frame, one adjacent one end of the frame and the other adjacent the head, said disks having elongated slots to receive the flattened extension, and a coil spring interposed between the disks and in surrounding relation to the extension, said disks having diametrically opposite lugs overlying the end of the spring to hold the same concentric with the extension.

3. In a shock or strain relieving device, the combination with a frame having one end pivoted to a double-tree and its other end provided with a transverse elongated slot, of a clevis pivoted to a plow frame having a flat bar extending through said elongated slot for angling slightly in the frame, a head member bolted to the end of said bar, the adjacent faces of the sides of said frame near its pivoted end having elongated oppositely disposed grooves, said head member having lugs engaging said grooves to guide the head member and the bar in its reciprocating actions, said lugs being rounded to permit the bar to angle in the frame, a pair of disk members on the flat bar, one adjacent the slotted end of said frame and provided with an elongated slot corresponding to the slot of the frame to permit the bar to angle, the other adjacent the head member, and a coil spring in surrounding relations with the bar and interposed between said disk members, said disk members having diametrically opposed lugs extending toward each other and overlying the opposite ends of said spring, to hold the spring concentric with the bar, the pivoted end of said frame having shoulders to be engaged by the head member to limit movement of the head member in one direction.

In testimony whereof I have signed my name to this specification in the presence of two subscribing witnesses.

HENRY A. HAMMERS.

Witnesses:
E. L. BAUER,
J. B. HUNT.

Copies of this patent may be obtained for five cents each, by addressing the "Commissioner of Patents, Washington, D. C."